United States Patent
Koshimae et al.

(10) Patent No.: US 10,940,559 B2
(45) Date of Patent: Mar. 9, 2021

(54) LASER PROCESSING MACHINE AND SYSTEM FOR SHAFT ADJUSTMENT

(71) Applicant: Mitsubishi Electric Corporation, Tokyo (JP)

(72) Inventors: Toshiki Koshimae, Tokyo (JP); Tomonori Mukae, Tokyo (JP); Masayuki Uematsu, Tokyo (JP); Hiroki Muraoka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/471,573

(22) PCT Filed: Oct. 19, 2017

(86) PCT No.: PCT/JP2017/037859
§ 371 (c)(1),
(2) Date: Jun. 20, 2019

(87) PCT Pub. No.: WO2019/077720
PCT Pub. Date: Apr. 25, 2019

(65) Prior Publication Data
US 2019/0351506 A1    Nov. 21, 2019

(51) Int. Cl.
*G05B 19/404* (2006.01)
*B23K 26/08* (2014.01)

(52) U.S. Cl.
CPC ............ *B23K 26/08* (2013.01); *G05B 19/404* (2013.01); *G05B 2219/37432* (2013.01)

(58) Field of Classification Search
CPC .. B23K 26/08; B23K 26/062; B23K 26/0876; B23K 26/70; G05B 2219/37432;
(Continued)

(56) References Cited

U.S. PATENT DOCUMENTS 5,404,418 A * 4/1995 Nagano ................. G05B 19/19
388/806
6,338,024 B1   1/2002 Taniguchi et al.
(Continued)

FOREIGN PATENT DOCUMENTS

CN    101354578 A    1/2009
DE    101 60 624 A1  6/2003
(Continued)

OTHER PUBLICATIONS

Fleischer, J., et al. "Workpiece and tool handling in metal cutting machines." CIRP annals 55.2 (2006): 817-839. (Year: 2006).*
(Continued)

*Primary Examiner* — Michael D Masinick
(74) *Attorney, Agent, or Firm* — Xsensus LLP

(57) ABSTRACT

A laser processing machine includes a processing head having a sensor, and a control unit to which a signal from the sensor is inputted. The control unit determines, by the signal, whether a drive shaft for the processing head needs to be adjusted. When the drive shaft is a state of needing adjustment, the control unit informs a display unit that the drive shaft is in a state of needing adjustment, and adjusts the drive shaft for the processing head by comparing data of a signal from the sensor with prestored data obtained during normal operation, in a different process than a laser processing process.

12 Claims, 9 Drawing Sheets

(58) Field of Classification Search
CPC ........ G05B 19/404; G05B 2219/37435; G05B 19/406; G05B 2219/45165
See application file for complete search history.

(56) References Cited

U.S. PATENT DOCUMENTS

| | | | |
|---|---|---|---|
| 2004/0204872 A1* | 10/2004 | Kato | G01C 19/56 702/56 |
| 2009/0030545 A1* | 1/2009 | Masuya | B23Q 17/12 700/175 |
| 2009/0071946 A1* | 3/2009 | Link | B23K 26/702 219/121.72 |
| 2013/0103183 A1 | 4/2013 | Mochida | |
| 2014/0009100 A1* | 1/2014 | Sera | G05B 5/01 318/611 |
| 2014/0144895 A1* | 5/2014 | Stork Genannt Wersborg | B23K 26/38 219/121.75 |
| 2015/0239059 A1 | 8/2015 | Myers | |
| 2017/0248939 A1* | 8/2017 | Shimura | G05B 19/4184 |
| 2018/0065250 A1* | 3/2018 | Murakami | B25J 9/1651 |

FOREIGN PATENT DOCUMENTS

| | | | |
|---|---|---|---|
| JP | 10-19535 A | | 1/1998 |
| JP | 11-296213 A | | 10/1999 |
| JP | 2008-801 A | | 1/2008 |
| JP | 2008000801 A | * | 1/2008 |
| JP | 2013-86172 A | | 5/2013 |
| JP | 2016-147282 A | | 8/2016 |
| JP | 2017-131909 A | | 8/2017 |

OTHER PUBLICATIONS

German Office Action dated Feb. 6, 2020 in German Application No. 11 2017 006 003.6.
Chinese Office Action dated Jan. 22, 2020 in Chinese Application No. 201780078838.4.
International Search Report and Written Opinion dated Nov. 21, 2017 for PCT/JP2017/037859 filed on Oct. 19, 2017, 7 pages including English Translation of the International Search Report.
Notification of Reasons for Refusal received for Japanese Patent Application No. 2018-514909, dated Jun. 12, 2018, 8 pages including English Translation.
Decision to Grant a Patent received for Japanese Patent Application No. 2018-514909, dated Sep. 4, 2018, 8 pages including English Translation.
Office Action dated Aug. 12, 2020 in Chinese Patent Application No. 201780078838.4, 15 pages.
Office Action dated Dec. 22, 2020, in corresponding Chinese patent Application No. 201780078838.4, 8 pages.

* cited by examiner

LASER PROCESSING MACHINE AND SYSTEM FOR SHAFT ADJUSTMENT

CROSS-REFERENCE TO RELATED APPLICATION

The present application is based on PCT/JP2017/037859, filed Oct. 19, 2017, which is incorporated herein by reference.

FIELD

The present invention relates to a laser processing machine and a laser processing system that process a workpiece by irradiating the workpiece with laser light while moving a processing head.

BACKGROUND

A laser processing machine is an apparatus that processes a workpiece by irradiating the workpiece with laser light while moving a processing head connected to a drive shaft. In the laser processing machine, the drive shaft deteriorates due to its long-time use. Hence, in the laser processing machine, along with the use of the drive shaft, the vibration of the processing head occurring when the processing head moves increases, resulting in that a movement instruction for the processing head does not match a shape of a processed workpiece.

In a mechanical apparatus described in Patent Literature 1, a vibration sensor is included in a position detector provided on a shaft of the mechanical apparatus, and when vibration detected by the vibration sensor is abnormal vibration, measures of stopping the mechanical apparatus are taken.

CITATION LIST

Patent Literature

Patent Literature 1: Japanese Patent Application Laid-open No. 11-296213

SUMMARY

Technical Problem

However, the above-described Patent Literature 1 which is conventional art has a problem that since an operator needs to repeat adjustment of the operation of the shaft and actual processing after stopping the mechanical apparatus, in order fora laser processing machine the mechanical apparatus to recover to its normal state, defective products are produced and the recovery requires a long time.

The present invention is made in view of the above description, and an object of the present invention is to obtain a laser processing machine that can recover to its normal state in a short time without producing defective products.

Solution to Problem

To solve the above-described problem and to achieve the object, the present invention provides a laser processing machine including processing head having a sensor; and a control apparatus to which a signal from the sensor is inputted, in which the control apparatus determines, by the signal, whether a shaft for the processing head needs to be adjusted, and when the shaft is in a state of needing adjustment, the control apparatus informs an external source that the shaft is in the state of needing adjustment. The control apparatus adjusts the shaft for the processing head by comparing data of a signal from the sensor with prestored data obtained during normal operation, in a different process than a laser processing process.

Advantageous Effects of Invention

The laser processing machine according to the present invention makes shaft adjustment in a different process than a laser processing process, and thus, provides an advantageous effect that the laser processing machine can recover to its normal state in a short time without producing defective products.

DESCRIPTION OF EMBODIMENTS

A laser processing machine and a laser processing system according to embodiments of the present invention will be described in detail below based on the drawings. Note that the invention is not limited to the embodiments.

First Embodiment

Figure 1:
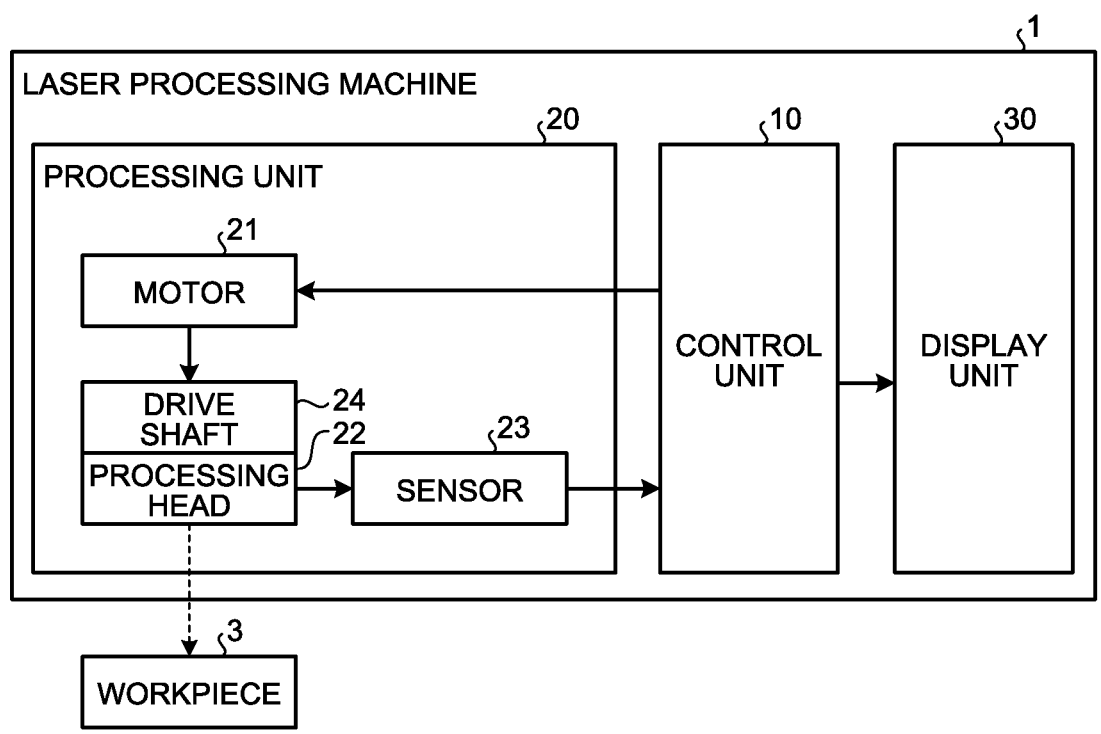
FIG. 1 is a block diagram illustrating a configuration of a laser processing machine according to a first embodiment of the present invention.

FIG. 1 is a block diagram illustrating a configuration of a laser processing machine according to a first embodiment of the present invention. A laser processing machine 1 is an apparatus that processes a workpiece 3 such as sheet metal by emitting laser light from a processing head 22. The laser processing machine 1 includes a processing unit 20 that processes the workpiece 3 using laser light; a control unit 10 that controls the processing unit 20; and a display unit 30 that displays information on laser processing. The workpiece 3 is a processing object to be subjected to laser processing by being irradiated with laser light. Note that in the following description the workpiece 3 may be referred to as a product, and the processing of the workpiece 3 may be referred to as product processing.

The processing unit 20 includes the processing head 22 that emits laser light; a drive shaft 24 connected to the processing head 22; and a motor 21 that drives the drive shaft 24. The motor 21 is a motor such as a servomotor, and allows the processing head 22 mounted on an end of the drive shaft 24 to move in an XY-plane or in XYZ-space by driving the drive shaft 24 which is a processing shaft. The XY-plane is a plane defined by an X-axis and a Y-axis, and the XYZ-space is space defined by an X-axis, a Y-axis, and a Z-axis. The XY-plane is a plane perpendicular to a Z-axis direction. An example of the Z-axis direction is a vertical direction, and the XY-plane in this case is a horizontal plane. When the laser processing machine 1 is a two-dimensional processing machine, the processing unit 20 allows the processing head 22 to move in the XY-plane, and when the laser processing machine 1 is a three-dimensional processing machine, the processing unit 20 allows the processing head 22 to move in the XYZ-space.

In addition, the processing unit 20 includes a sensor 23 which is an acceleration measuring unit. The sensor 23 is an acceleration sensor that is mounted on the processing head 22 and measures acceleration of the processing head 22 for when the processing head 22 moves. Note that the sensor 23 may measure other information than acceleration. When the processing head 22 moves in the XY-plane, for the sensor 23, a sensor that detects acceleration in an X-axis direction and a Y-axis direction is applied. In addition, when the processing head 22 moves in the XYZ-space, for the sensor 23, a sensor that detects acceleration in the X-axis direction, the Y-axis direction, and the Z-axis direction is applied. As such, it is desirable that when the processing head 22 moves in the directions of three or more axes, the sensor 23 be able to measure acceleration for each axis, but in the case of two-dimensional processing, it is sufficient that the sensor 23 be able to measure acceleration in at least two-axis directions.

The sensor 23 transmits a signal of information such as measured acceleration to the control unit 10. Note that the signal of acceleration transmitted to the control unit 10 from the sensor 23 may be an analog signal or may be a digital signal.

The control unit 10 which is a control apparatus is connected to the processing unit 20 and the display unit 30. The control unit 10 is connected to the motor 21 and the sensor 23. The control unit 10 outputs an instruct on to the motor 21 and accepts acceleration which is a measurement result from the sensor 23. The control unit 10 of the first embodiment determines, by a signal from the sensor 23, whether the drive shaft 24 which is a shaft for the processing head 22 needs to be adjusted, and when the drive shaft 24 is a state of needing adjustment, the control unit 10 informs an external source such as the display unit 30 that the drive shaft 24 is in a state of needing adjustment. In addition, by an operator operating the control unit 10, the control unit 10 automatically adjusts the drive shaft 24 by comparing data of a signal from the sensor 23 with data obtained during normal operation which will be described later, in a different process than a laser processing process.

Specifically, when a condition for performing test operation which will be described later is met, the control unit 10 allows the processing head 22 to perform test operation in an off-line process which is a different process than an actual laser processing process. The laser processing process is a process during which a product is in the process of being manufactured, and the off-line process is a process performed at different timing than a process during which a product is manufactured. In other words, the manufacturing process is a process performed in the laser processing process, and the off-line process is a process that is other than the laser processing process and that is not performed simultaneously with the manufacturing of a product. The control unit 10 may perform test operation when the moving operation of the processing head 22 in a manufacturing process is abnormal, or when an instruction to perform test operation is inputted to the control unit 10 from the operator. In addition, the control unit 10 compares first acceleration of the processing head 22 measured by the sensor 23 when the processing head 22 performs test operation with reference data serving as reference acceleration which will be described later.

In addition, the control unit 10 adjusts the operation of the drive shaft 24 which is the shaft for the processing head 22, based on a result of the comparison between the first acceleration of the processing head 22 and the reference data which is data obtained during normal operation. When the control unit 10 adjusts the operation of the drive shaft 24, the control unit 10 adjusts, for example, parameters used when controlling the processing head 22. The parameters used when controlling the processing head 22 are control parameters stored in the control unit 10. Examples of the parameters to be adjusted include the acceleration of the processing head 22 obtained upon movement, the moving speed of the processing head 22, gain used when the movement of the processing head 22 is controlled, and timing at which the processing head 22 moves. These parameters are parameters for adjusting the operation of the drive shaft 24. Therefore, the control unit 10 adjusts the operation of the drive shaft 24 by adjusting the parameters. The laser processing machine 1 adjusts the operation of the processing head 22 by adjusting the operation of the drive shaft 24.

Note that the control unit 10 allows the processing head 22 to perform operation performed in a manufacturing process, in a laser processing process. Then, when a difference between second acceleration of the processing head 22 measured by the sensor 23 during the manufacturing process and reference acceleration which is acceleration obtained during normal processing is greater than or equal to an allowable value, the control unit 10 informs about an abnormality and performs test operation. Note that the control unit 10 may calculate a vibration waveform of the processing head 22 from the acceleration measured by the sensor 23. The vibration waveform corresponds to changes in the position of the processing head 22 during the manufacturing process. When the control unit 10 calculates a vibration waveform, the control unit 10 compares the calculated vibration waveform with a reference vibration waveform which is a vibration waveform obtained during normal processing, and when the amount of difference between the waveforms is greater than or equal to an allowable value, the control unit 10 informs about an abnormality and performs test operation.

The reference data is third acceleration of the processing head 22 obtained when the drive shaft 24 performs test operation in a normal state. In other words, the reference data is data of a signal that is actually outputted from the sensor 23 in an off-line process when the operation of the processing head 22 is normal. Therefore, the control unit 10 compares the third acceleration of the processing head 22 obtained when the drive shaft 24 performs test operation in a normal state with the first acceleration of the processing head 22 obtained when test operation is performed. Note that the reference data may be acceleration actually measured by the sensor 23, or may be acceleration predicted to be measured by the sensor 23.

The display unit 30 displays, in response to an instruction from the control unit 10, various information such as a result of determination as to whether an abnormality has occurred in the operation of the processing head 22, a result of determination as to whether to perform test operation, and a result of a comparison between acceleration obtained upon test operation and the reference data. The acceleration obtained upon test operation is the above-described first acceleration, i.e., the acceleration of the processing head 22 measured by performing test operation. Note that the display unit 30 may display, in response to an instruction from the control unit 10, information such as the type of parameter to be adjusted, parameters obtained before and after adjustment, the first to third acceleration, a moving path of the processing head 22 during laser processing, a moving path of the processing head 22 during test operation, and the reference data.

Upon product processing, the laser processing machine 1 of the first embodiment detects acceleration obtained when the processing head 22 moves, by the sensor 23 mounted on the end of the processing head 22. Then, when an abnormality has detected in the acceleration obtained when the processing head 22 moves, the laser processing machine 1 allows the processing head 22 to move to perform predetermined test operation, after the completion of the product processing. At this time, the laser processing machine measures acceleration of the processing head 22 by the sensor 23. Then, the laser processing machine 1 adjusts parameters used to control the motor 21, based on a difference between the acceleration obtained upon test operation and the reference data. By this, the laser processing machine 1 changes the operation of the drive shaft 24, enabling the actual track of the processing head 22 to approach an deal track which is a track corresponding to the reference data. A moving track of the processing head 22 which is a track of the processing head 22 represents changes in the moving coordinates of the processing head 22.

Figure 2:
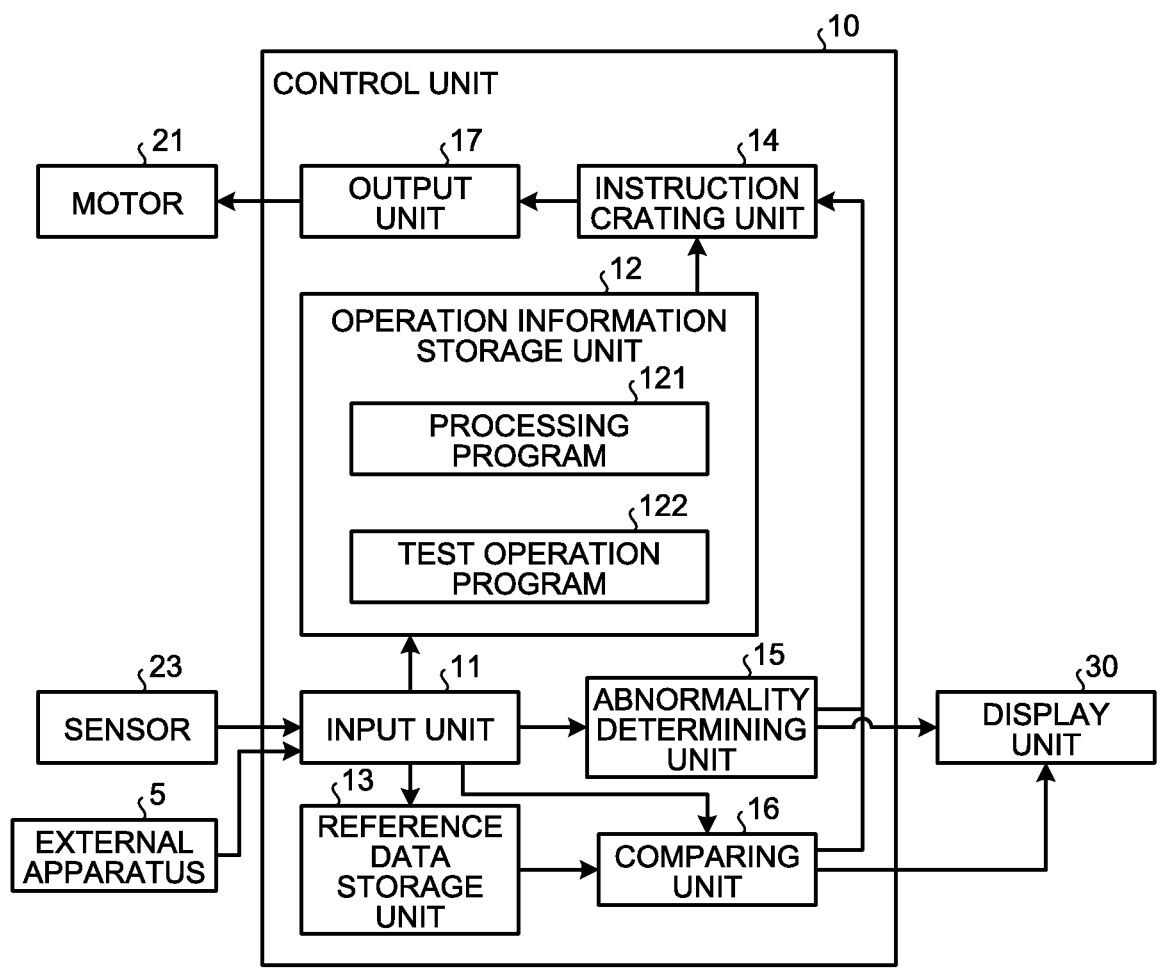
FIG. 2 is a block diagram illustrating a configuration of a control unit included in the laser processing machine according to the first embodiment.

FIG. 2 is a block diagram illustrating a configuration of the control unit included in the laser processing machine according to the first embodiment. The control unit 10 included in the laser processing machine 1 includes an input unit 11 that accepts acceleration which is a measurement result from the sensor 23; an operation information storage unit 12 that stores information used when the processing head 22 operates; and a reference data storage unit 13 that stores reference data. In addition, the control unit 10 includes an abnormality determining unit 15 that determines whether the processing head 22 is abnormal in acceleration upon product processing; and a comparing unit 16 that compares acceleration of the processing head 22 measured upon test operation with the reference data. In addition, the control unit 10 includes an instruction creating unit 14 that creates an instruction for the motor 21; and an output unit 17 that outputs the created instruction to the motor 21.

The input unit 11 is connected to the operation information storage unit 12, the reference data storage unit 13, the abnormality determining unit 15, and the comparing unit 16. The reference data storage unit 13 is connected to the comparing unit 16. The instruction creating unit 14 is connected to the operation information storage unit 12, the abnormality determining unit 15, the comparing unit 16, and the output unit 17.

The input unit 11 is connected to the sensor 23 and an external apparatus 5, the output unit 17 is connected to the motor 21, and the abnormality determining unit 15 and the comparing unit 16 are connected to the display unit 30.

The input unit 11 accepts acceleration from the sensor 23 and inputs the acceleration to the abnormality determining unit 15 or the comparing unit 16. Upon product processing, the input unit 11 inputs acceleration from the sensor 23 to the abnormality determining unit 15, and upon test operation, the input unit 11 inputs acceleration from the sensor 23 to the comparing unit 16. In addition, the input unit 11 inputs a processing program 121 and a test operation program 122 from the external apparatus 5, to the operation information storage unit 12. In addition, the input unit 11 inputs reference data from the external apparatus 5, to the reference data storage unit 13.

The operation information storage unit 12 stores the processing program 121 and the test operation program 122. The processing program 121 is a program used when the workpiece 3 is processed, and includes a program instruction to allow the processing head 22 to move. Upon product processing, the laser processing machine 1 performs laser processing on the workpiece 3 using the processing program 121. By this, the laser processing machine 1 allows the processing head 22 to move along a track and at a moving speed according to the processing program 121.

In addition, the test operation program 122 is a program used when the processing head 22 performs test operation, and includes a program instruction to allow the processing head 22 to move. Upon test operation, the laser processing machine 1 allows the processing head 22 to move using the test operation program 122. The test operation is different operation than operation of the processing head 22 performed when the workpiece 3 is a product. Examples of the test operation include moving operation of the processing head 22 in the X-axis direction and moving operation of the processing head 22 in the Y-axis direction.

Product processing performed by the laser processing machine 1 is a process in which the laser processing machine 1 processes the workpiece 3 in a manufacturing process, using the processing program 121. In addition, test operation performed by the laser processing machine 1 is a process in which the laser processing machine 1 allows the processing head 22 to move in an off-line process which is a different process than a manufacturing process, using the test operation program 122. In the test operation, the laser processing machine 1 performs only movement of the processing head 22 without irradiating laser light from the processing head 22.

Note that the laser processing machine 1 may perform product processing based on a drawing corresponding to the processing program 121, instead of the processing program 121. In addition, the laser processing machine 1 may perform test operation based on a drawing corresponding to the test operation program 122, instead of the test operation program 122.

The abnormality determining unit 15 determines whether the moving operation of the processing head 22 performed upon product processing is abnormal, based on whether acceleration of the processing head 22 obtained upon the product processing is abnormal. The abnormality determining unit 15 calculates, for example, a vibration waveform of the processing head 22 based on the acceleration of the processing head 22. The abnormality determining unit 15 compares the calculated vibration waveform with a reference vibration waveform, and determines whether the vibration waveform of the processing head 22 obtained upon the product processing is abnormal, based on a result of the comparison. The reference vibration waveform as used herein may be an ideal waveform with no vibration, i.e., the same as the processing shape of the processing program 121. When the amount of difference between the calculated vibration waveform and the reference vibration waveform is greater than or equal to an allowable value, the abnormality determining unit 15 determines that the moving operation of the processing head 22 performed upon the product processing is abnormal. The amount of difference between the calculated vibration waveform and the reference vibration waveform is obtained by integrating the difference between the vibration waveforms in time. Note that the abnormality determining unit 15 may determine whether the moving operation of the processing head 22 performed upon product processing is abnormal, based on acceleration of the processing head 22 obtained at specific timing during the product processing. In this case, when a difference between reference acceleration obtained at the specific timing during normal processing and acceleration obtained at: the specific timing during product processing is greater than or equal to an allowable value, the abnormality determining unit 15 determines that moving operation performed upon the product processing is abnormal. The abnormality determining unit 15 transmits a result of the determination to the instruction creating unit 14 and the display unit 30.

The comparing unit 16 compares acceleration of the processing head 22 obtained upon test operation with the reference data read from the reference data storage unit 13, and transmits a result of the comparison to the instruction creating unit 14 and the display unit 30.

The instruction creating unit 14 creates a movement instruction to allow the processing head 22 to move, based on the parameters. In the laser processing machine 1, by the motor 21 operating, the processing head 22 connected to the drive shaft 24 moves. Hence, the movement instruct on to allow the processing head 22 to move is an instruction to allow the motor 21 to operate. Therefore, the instruction creating unit 14 creates an instruction to control the motor 21 as the movement instruction to allow the processing head 22 to move. In the laser processing machine 1, by the instruction creating unit 14 controlling the motor 21, the position, moving speed, and acceleration of the processing head 22 are controlled. Upon product processing, the instruction creating unit 14 creates a movement instruction using the processing program 121. In addition, upon test operation, the instruction creating unit 14 creates a movement instruction using the test operation program 122.

In addition, the instruction creating unit 14 adjusts the parameters based on a result of a comparison between acceleration of the processing head 22 obtained when test operation is performed and the reference data. The instruction creating unit 14 calculates parameters with which the amount of vibration of the processing head 22 is less than or equal to a certain value, replaces set parameters with the calculated parameters, and thereby adjusts the set parameters. The instruction creating unit 14 transmits the created movement instruction to the output unit 17. The output unit 17 outputs the movement instruction created by the instruction creating unit 14 to the motor 21.

Figure 3:
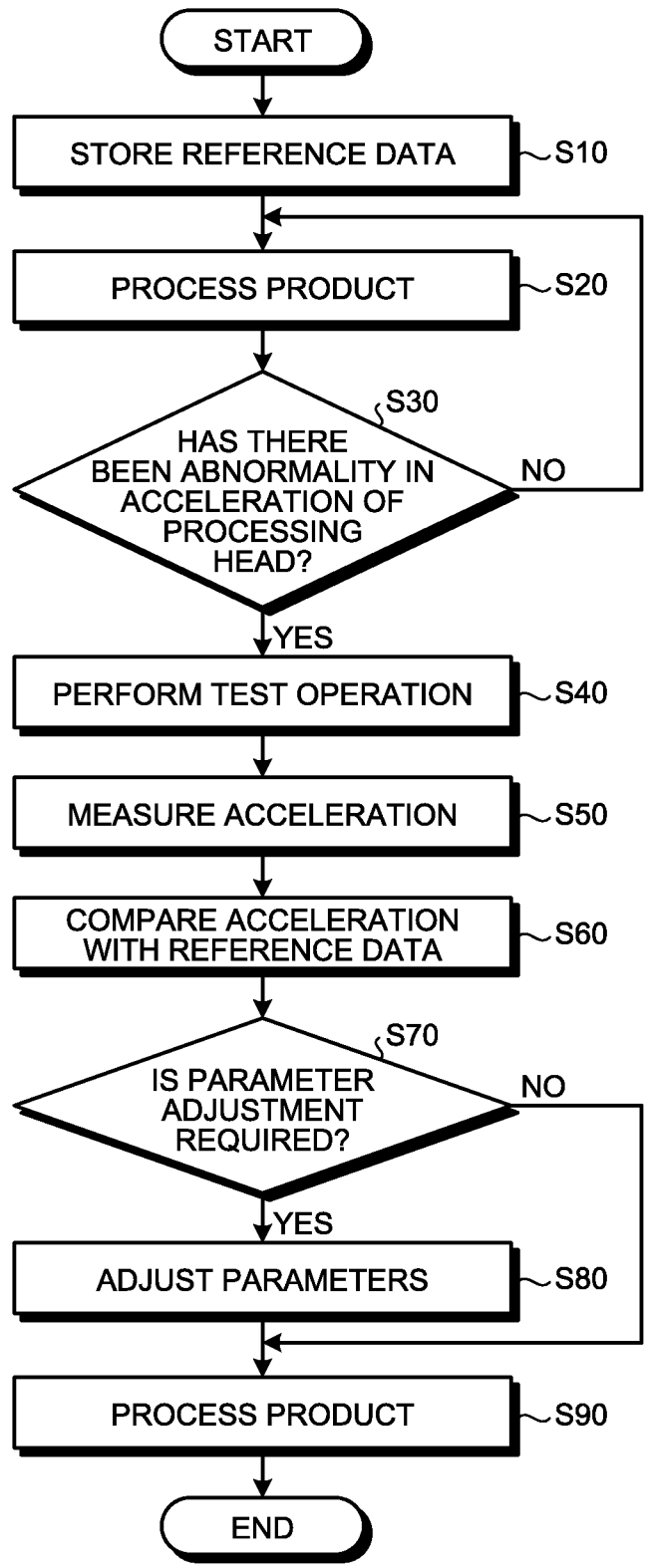
FIG. 3 is a flowchart illustrating a processing process procedure of the laser processing machine according to the first embodiment.

FIG. 3 is a flowchart illustrating a processing process procedure of the laser processing machine according to the first embodiment. At step S10, the control unit 10 in the laser processing machine 1 receives reference data transmitted from the external apparatus 5, and stores the reference data in the reference data storage unit 13.

Thereafter, at step S20, the laser processing machine 1 processes a workpiece 3 which becomes a product. Specifically, the instruction creating unit 14 in the control unit 10 reads the processing program 121 from the operation information storage unit 12, and creates a movement instruct on using the processing program 121. Then, the output unit 17 outputs the created movement instruction to the motor 21. By this, the laser processing machine 1 processes the workpiece 3 while moving the processing head 22.

When the processing of the product is completed, at step S30, the laser processing machine 1 determines whether there has been an abnormality in the acceleration of the processing head 22 during the product processing. Specifically, the sensor 23 measures acceleration of the processing head 22 during the product processing, and transmits the measured acceleration to the control unit 10. Then, the abnormality determining unit 15 in the control unit 10 calculates a vibration waveform of the processing head 22 based on the acceleration of the processing head 22 obtained during the product processing. The vibration waveform of the processing head 22 is a waveform represented as the displacements of the respective axes of the processing head 22 with respect to time. The abnormality determining unit 15 calculates the vibration waveform of the processing head 22 by performing double integration on the acceleration measured by the sensor 23. Furthermore, the abnormality determining unit 15 compares the calculated vibration waveform with a reference vibration waveform, and determines whether the acceleration of the processing head 22 during the product processing has been abnormal, based on a difference between the vibration waveforms which is a result of the comparison. The abnormality determining unit 15 determines that the moving operation of the processing head 22 abnormal, for example, when the amount of difference between the vibration waveforms is greater than or equal to an allowable value. In addition, the abnormality determining unit 15 may calculate, for each time, a difference between the calculated vibration waveform and the reference vibration waveform, and use a total value of the differences for the respective times as a difference between the vibration waveforms. In this case, when the total value of the differences for the respective times is greater than or equal to an allowable value, the abnormality determining unit 15 may determine that the moving operation of the processing head 22 is abnormal.

In such a process at step S30, an abnormality determination may be made not only automatically but also by an operator. For example, the laser processing machine 1 may display the aforementioned calculated vibration waveform on a screen of the display unit 30, and allow the operator to determine whether the moving operation of the processing head 22 is abnormal. Here, the vibration waveform displayed on the screen by the display unit 30 is an example of information displayed on the screen. The display unit 30 may display information with which the operator can determine an abnormality in the operation of the processing head 22, using information obtained from the sensor 23, such as a difference between a calculated vibration waveform and the reference vibration waveform. In addition, the control unit 10 may output acceleration of the processing head 22 measured by the sensor 23 during the product processing or a vibration waveform calculated based on the acceleration, to an external source such as the display unit 30. By this, the display unit 30 displays the acceleration of the processing head 22 or the vibration waveform calculated based on the acceleration, as information for determining whether parameter adjustment is required.

Note that the control unit 10 may start a process of determining whether there has been an abnormality in the acceleration of the processing head 22, during the processing of the product. In this case, the abnormality determining unit 15 determines whether there has been an abnormality, in turn from measured acceleration. In addition, a method of determining whether there has been an abnormality in the acceleration of the processing head 22 is not limited to the above-described method, and other methods may be applied. For example, the control unit 10 may determine whether there has been an abnormality in the acceleration of the processing head 22, using a determination method described in Japanese Patent Application Laid-open No. 2006-154998, during processing using the processing program 121.

The abnormality determining unit 15 transmits a result of the determination to the instruction creating unit 14 and the display unit 30. The display unit 30 displays the result of the determination by the abnormality determining unit 15, and thereby notifies the operator of the result of the determination by the abnormality determining unit 15.

If the abnormality determining unit 15 has not detected an abnormality, i.e., if No at step S30, the laser processing machine 1 returns to the process at step S20, and processes a net workpiece 3 which becomes a product.

If the abnormality determining unit 15 has detected an abnormality, i.e., if Yes at step S30, when an operation for starting test operation is performed on the control unit 10, the laser processing machine 1 performs test operation at step S40. Specifically, the instruction creating unit 14 in the control unit 10 reads the test operation program 122 from the operation information storage unit 12, and creates a movement instruction for the processing head 22 using the test operation program 122. Then, the output unit 17 outputs the created movement instruction to the motor 21. By this, the laser processing machine 1 allows the processing head 22 to move without allowing the processing head 22 to emit laser light.

During the performance of the test operation, at step S50, the laser processing machine 1 measures acceleration of the processing head 22 by the sensor 23. The sensor 23 transmits the measured acceleration to the control unit 10. At step S60, the comparing unit 16 compares the acceleration of the processing head 22 obtained upon test operation with the reference data read from the reference data storage unit 13.

At step S70, the comparing unit 16 determines whether parameters used when the processing head 22 moves need to be adjusted, based on a difference between the acceleration of the processing head 22 obtained upon test operation and the reference data.

When the difference between the acceleration of the processing head 22 obtained upon test operation and the reference data is greater than or equal to a threshold, the comparing unit 16 determines that the parameters need to be adjusted. On the other hand, when the difference between the acceleration of the processing head 22 obtained upon test operation and the reference data is smaller than the threshold, the comparing unit 16 determines that the parameters do not need to be adjusted.

The comparing unit 16 transmits a result of the comparison to the instruction creating unit 14 and the display unit 30. The result of the comparison includes the amount of difference between the acceleration and the reference data and a result of the determination as to whether the parameters need to be adjusted. The display unit 30 displays the result of the comparison by the comparing unit 16 and thereby notifies the operator of the result of the comparison.

If the comparing unit 16 determines that the parameters need to be adjusted, i.e., if Yes at step S70, at step S80, the instruction creating unit 14 adjusts the parameters. At this time, the instruction creating unit 14 adjusts the parameters such that the amount of vibration of the processing head 22 is less than or equal to a certain value. Specifically, the instruction creating unit 14 adjusts the parameters so as to reduce a difference between a track of the processing head 22 obtained when the test operation is performed and a track of the processing head 22 corresponding to the reference data. As such, when there is an abnormality in the acceleration of the processing head 22, the laser processing machine 1 allows the processing head 22 to perform test operation, and adjusts the parameters based on the amount of difference between acceleration obtained upon the test operation and the reference data.

Thereafter, the instruction creating unit 14 creates a movement instruction used when a product is processed, using the adjusted parameters. By this, at step S90, the laser processing machine 1 processes a next workpiece 3 which becomes a product.

On the other hand, if the comparing unit 16 determines that the parameters do not need to be adjusted, i.e., if No at step S70, the instruction creating unit 14 does not adjust the parameters. Thereafter, the instruction creating unit 14 creates a movement instruction used when a product is processed, using the parameters that have not been adjusted. By this, at step S90, the laser processing machine 1 processes a next workpiece 3 which becomes a product. Note that the laser processing machine 1 may be set to automatically perform the processes at step S40 to S80 without accepting an instruction from the operator.

As such, the laser processing machine 1 processes a workpiece 3 while moving the processing head 22 according to the processing program 121. Then, the laser processing machine 1 determines an abnormality in the processing head 22 occurring during the product processing, based on acceleration of the processing head 22 measured by the sensor 23. Then, when there is an abnormality in the acceleration of the processing head 22, the laser processing machine 1 allows the processing head 22 to perform test operation without processing a workpiece 3, and adjusts the parameters based on the amount of difference between acceleration obtained upon the test operation and the reference data.

Figure 4:
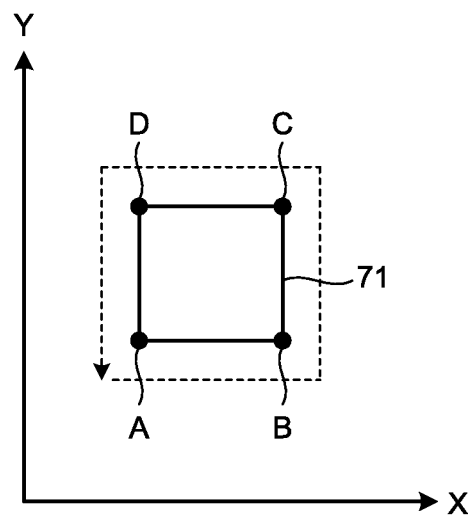
FIG. 4 is a diagram for describing an example of test operation according to the first embodiment.

Now, an example of test operation will be described. FIG. 4 is a diagram for describing an example of test operation according to the first embodiment. FIG. 4 illustrates an example of a moving path of the processing head 22 upon test operation. The following describes a case in which the processing head 22 moves in the XY-plane.

The processing head 22 greatly vibrates when processing a corner portion with a right angle to the workpiece 3, and the positional displacement of a track increases. Therefore, it is desirable that the operation of the processing head 22 upon test operation include operation performed when a corner portion with a right angle is processed. In addition, it is desirable that the movement of the processing head 22 upon test operation include movement in various directions.

An example of test operation includes moving operation of the processing head 22 along the sides of a quadrilateral. FIG. 4 illustrates a case in which test operation allows the processing head 22 to move along the sides of a quadrilateral consisting of vertices A, B, C, and D in order of the vertices A, B, C, and D.

A path 71 of the processing head 22 in this case includes a path from the vertex A to the vertex B, a path from the vertex B to the vertex C, a path from the vertex C to the vertex D, and a path from the vertex D to the vertex A. Test operation for the path 71 includes moving operation of the processing head 22 in a +X-axis direction, moving operation of the processing head 22 in a +Y-axis direction, moving operation of the processing head 22 in a −X-axis direction, and moving operation of the processing head 22 in a −Y-axis direction.

As such, it is desirable that, a path along which the processing head 22 moves by test operation be a path with which vibration tendencies can be independently grasped for each moving direction of the drive shaft 24. Note that the path along which the processing head 22 moves by test operation is not limited to a path along the sides of a quadrilateral, and may be a path along any shape. Other examples of the path along which the processing head 22 moves include a path along a triangle, a path along a polygon which is a pentagon or larger, and a path along a curve such as a circle. In addition, the path along which the processing head 22 moves may be a path including a combination of a curve and a straight line.

Now, an example of a specific method of adjusting parameters will be described. Note that since a method of adjusting parameters for the X-axis direction and a method of adjusting parameters for an axial direction other than the X-axis direction are the same adjustment process, here, the method of adjusting parameters for the X-axis direction will be described.

Figure 5:
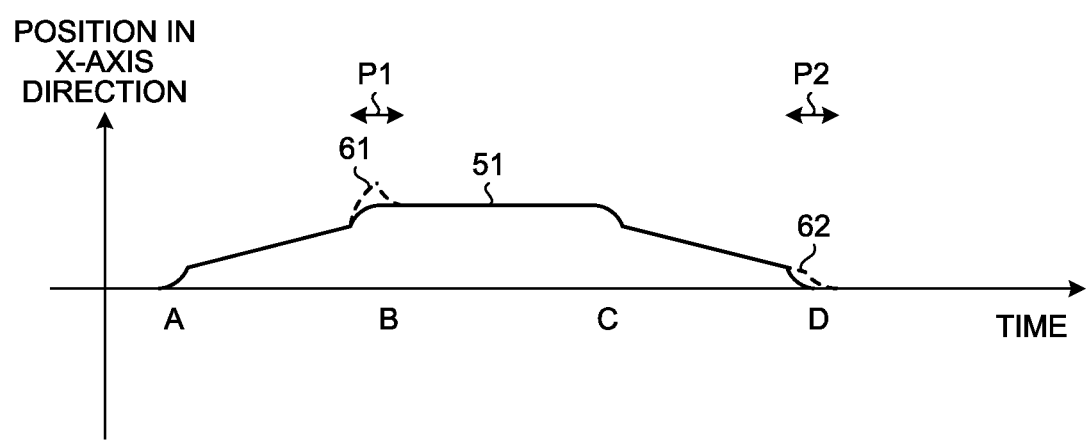
FIG. 5 is a diagram illustrating the position in an X-axis direction of a processing head for when the processing head moves along a path illustrated in FIG. 4.
Figure 6:
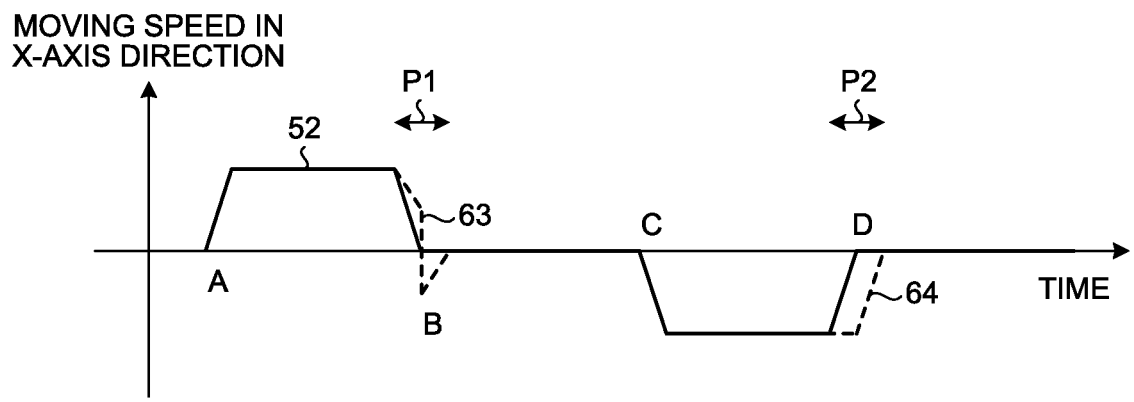
FIG. 6 is a diagram illustrating the moving speed in the X-axis direction of the processing head for when the processing head moves along the path illustrated in FIG. 4.
Figure 7:
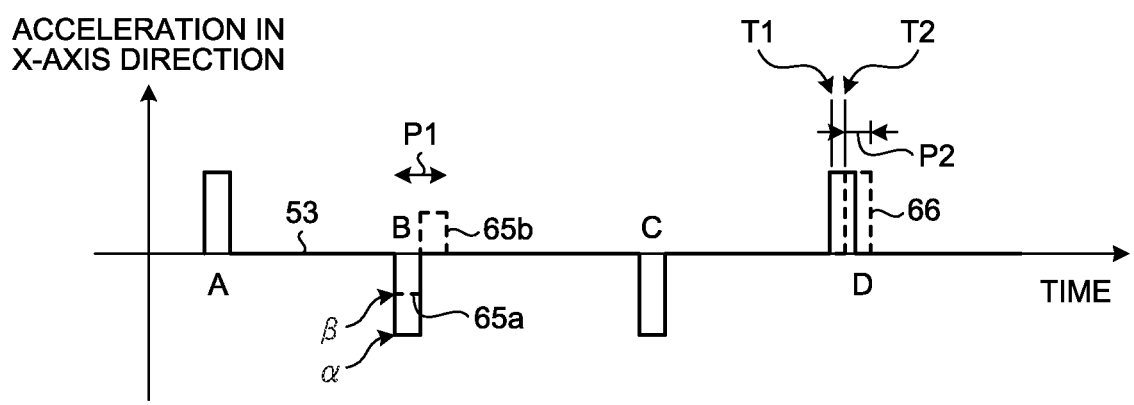
FIG. 7 is a diagram illustrating the acceleration in the X-axis direction of the processing head for when the processing head moves along the path illustrated in FIG. 4.

FIG. 5 is a diagram illustrating the position in the X-axis direction of the processing head for when the processing head moves along the path illustrated in FIG. 4. In addition, FIG. 6 is a diagram illustrating the moving speed in the X-axis direction of the processing head for when the processing head moves along the path illustrated in FIG. 4. In addition, FIG. 7 is a diagram illustrating the acceleration in the X-axis direction of the processing head for when the processing head moves along the path illustrated in FIG. 4. A horizontal axis of a graph illustrated in FIG. 5 represents time, and a vertical axis represents the position of the processing head 22 in the X-axis direction. A horizontal axis of a graph illustrated in FIG. 6 represents time, and a vertical axis represents the moving speed of the processing head 22 in the X-axis direction. A horizontal axis of a graph illustrated in FIG. 7 represents time, and a vertical axis represents the acceleration of the processing head 22 in the X-axis direction.

A position characteristic 51 of FIG. 5 indicates the position of the processing head 22 for when test operation is performed with the drive shaft 24 being in a normal state. Therefore, the position characteristic 51 is the position of the processing head 22 corresponding to reference data. A position characteristic 61 at an abnormal point P1 and a position characteristic 62 at an abnormal point P2 which are illustrated in FIG. 5 indicate the positions of the processing head 22 for when test operation is performed with the drive shaft 24 being in an abnormal state.

A speed characteristic 52 of FIG. 6 indicates the moving speed of the processing head 22 for when test operation is performed with the drive shaft 24 being in a normal state. Therefore, the speed characteristic 52 is the moving speed of the processing head 22 corresponding to reference data. A speed characteristic 63 at the abnormal point P1 and a speed characteristic 64 at the abnormal point P2 which are illustrated in FIG. 6 indicate the moving speeds of the processing head 22 for when test operation is performed with the drive shaft 24 being in an abnormal state.

An acceleration characteristic 53 of FIG. 7 indicates the acceleration of the processing head 22 for when test operation is performed with the drive shaft 24 being in a normal state. Therefore, the acceleration characteristic 53 is reference data. Acceleration characteristics 65a and 65b at the abnormal point P1 and an acceleration characteristic 66 at the abnormal point P2 which are illustrated in FIG. 7 indicate the acceleration of the processing head 22 for when test operation is performed with the drive shaft 24 being in an abnormal state.

The abnormal point P1 indicates a case in which the responsiveness of the drive shaft 24 to a movement instruction is poor. In this case, the processing head 22 cannot follow operation corresponding to the movement instruction and thus a delay occurs, and when the processing head 22 stops, an overshoot occurs. This indicates that the drive shaft 24 has not been able to follow a deceleration instruction provided to the drive shaft 24. Hence, by the laser processing machine 1 performing control such that the drive shaft 24 can follow the deceleration instruction which is a movement instruction, by gently changing the deceleration instruction, i.e., by reducing acceleration, the occurrence of an overshoot can be prevented.

The instruction creating unit 14 can eliminate the occurrence of the abnormal point P1 by adjusting the acceleration of the drive shaft 24 among the parameters. Therefore, as illustrated in FIG. 7, the instruction creating unit 14 reduces acceleration $\alpha$ to acceleration $\beta$. The acceleration $\beta$ is acceleration that the drive shaft 24 can actually follow. As such, by the instruction creating unit 14 reducing the acceleration to the acceleration $\beta$ that the drive shaft 24 can actually follow, the occurrence of an overshoot of the processing head 22 can be prevented.

In addition to the adjustment of acceleration, the instruction creating unit 14 may perform, as general overshoot measures, a parameter adjustment process in which the gain of the motor 21 that allows the drive shaft 24 to operate is reduced. The gain of the motor 21 is control gain used when the motor 21 is controlled. Since it is clear from the acceleration characteristic 65a that the drive shaft 24 can only follow up to the acceleration $\beta$, the instruction creating unit 14 reduces the gain at a ratio with respect to the acceleration $\alpha$ that can be followed during normal operation. Namely, the instruction creating unit 14 uses gain obtained by multiplying conventional gain being applied by ($\beta/\alpha$), as adjusted gain.

In addition, the instruction creating unit 14 may prevent the occurrence of an overshoot of the processing head 22 by adjusting the moving speed of the processing head 22 which is processing speed. By the instruction creating unit 14 decreasing an instruction speed for specifying moving speed, the kinetic energy of the drive shaft 24 decreases, and thus, even at the same acceleration, the vibration of the drive shaft 24 decreases. Since it is clear from the acceleration characteristic 65a that the drive shaft 24 can only follow up to the acceleration $\beta$, the instruction creating unit 14 reduces the gain the moving speed at a ratio with respect to the acceleration a that can be followed during normal operation. For example, since the kinetic energy is proportional to the square of moving speed, the instruction creating unit 14 applies a moving speed obtained by multiplying a conventional moving speed by $(\beta/\alpha)^{1/2}$, as an adjusted moving speed.

The abnormal point P2 indicates a case in which the responsiveness of the drive shaft 24 to a movement instruction is poor and the start of deceleration of the processing head 22 is delayed. In this case, since the start of deceleration is delayed, the laser processing machine 1 starts deceleration of the processing head 22 earlier. The instruction creating unit 14 calculates a time difference between a time T2 which is the actual deceleration start time and a time T1 which is an ideal deceleration start time, based on the acceleration characteristics 53 and 66, and sets the parameters such that deceleration starts earlier by the time difference. The time T2 is a time at which the absolute value of the acceleration of the processing head 22 starts to increase upon test operation. The time T1 is a time at which the absolute value of the acceleration of the reference data starts to increase. As such, the instruction creating unit 14 can easily find deceleration start time based on the acceleration characteristics 53 and 66.

In general, deterioration of the drive shaft 24 occurs due to the looseness or abrasion of a fastening portion of a member forming the drive shaft 24. An example of deterioration of the drive shaft 24 includes a reduction in stiffness caused by an increase in a gap between members forming the drive shaft 24. When there is a deterioration in the drive shaft 24, in most cases, the responsiveness of the drive shaft 24 gets poorer. Hence, the first embodiment describes a case in which the responsiveness of the drive shaft 24 gets poorer. Note that when the responsiveness of the drive shaft 24 gets better, the instruction creating unit 14 performs a parameter adjustment process in which the responsiveness is made poorer, such as increasing acceleration, increasing the gain of the motor 21, or increasing moving speed.

As such, the control unit 10 computes a deviation between acceleration measured by the sensor 23 during test operation which is predetermined operation and the reference data, and adjusts the parameters to appropriate values based on a result of the computation. By this, the control unit 10 can reduce a deviation between a track of the processing head 22 obtained when test operation is performed and a track of the processing head 22 corresponding to the reference data.

Note that the behavior of the processing head 22 upon movement may vary between (1) when accelerating in the +X-direction, (2) when decelerating in the +X-axis direction, (3) when accelerating in the −X-axis direction, and (4) when decelerating in the −X-axis direction. The acceleration in the +X-axis direction is acceleration at the vertex A illustrated in FIG. 4, and the deceleration in the +X-axis direction is deceleration at the vertex B illustrated in FIG. 4. In addition, the acceleration in the −X-axis direction is acceleration at the vertex C illustrated in FIG. 4, and the deceleration in the −X-axis direction is deceleration at the vertex D illustrated in FIG. 4. In this case, the instruction creating unit 14 adjusts the parameters for (1) to (4). Namely, when the behavior of the processing head 22 upon movement varies depending on the moving direction of the processing head 22, the instruction creating unit 14 adjusts the parameters for each moving direction of the processing head 22. In addition, when the behavior of the processing head 22 upon movement varies between when the processing head 22 accelerates and when the processing head 22 decelerates, the instruction creating unit 14 makes different parameter adjustments for acceleration and deceleration.

Note that the instruction creating unit 14 may adjust the parameters stored in the instruction creating unit 14, or may adjust a parameter set in a processing condition in the processing program 121. When the instruction creating unit 14 adjusts the parameter set in the processing condition in the processing program 121, the instruction creating unit 14 inserts a set value for parameter adjustment in the processing program 121. Then, the instruction creating unit 14 the movement of the drive shaft 24 based on the inserted set value. An example of the processing condition in the processing program 121 is processing speed. Note that the instruction creating unit 14 may adjust any parameter and may adjust parameters in any format.

Figure 8:
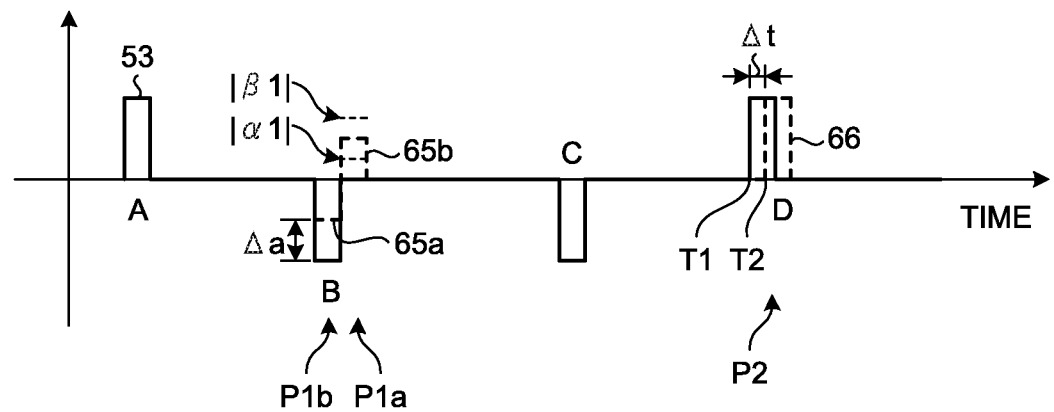
FIG. 8 is a diagram for describing a method of determining whether a drive shaft needs to be adjusted, according to the first embodiment.

Next, a method of determining, by the comparing unit 16, whether the parameters need to be adjusted will be described. FIG. 8 is a diagram for describing a method of determining whether the drive shaft needs to be adjusted, according to the first embodiment. A vertical axis of a graph illustrated in FIG. 8 represents the acceleration of the processing head 22 in the X-axis direction, and a horizontal axis represents time. As described above, the comparing unit 16 compares the acceleration characteristics 65a and 65b which are acceleration measured upon test operation with the acceleration characteristic 53 which is the reference data.

First Exemplary Determination Method

When the comparing unit 16 has detected vibration that is not present in the reference data and the level of the vibration has exceeded a reference value, the comparing unit 16 determines that the parameters need to be adjusted. Specifically, when the absolute value of acceleration of the processing head 22 obtained upon test operation is greater than a first threshold, the comparing unit 16 determines that the parameters need to be adjusted. In addition, when the absolute value of the acceleration of the processing head 22 obtained upon test operation is less than or equal to the first threshold, the comparing unit 16 determines that the parameters do not need to be adjusted.

For example, at an abnormal point P1a, as indicated by the acceleration characteristic 65b obtained upon test operation, acceleration in the +X-axis direction has occurred. When the absolute value of the acceleration characteristic 65b has exceeded the first threshold, the comparing unit 16 determines that the parameters need to be adjusted. When the first threshold is set to $|\alpha 1|$, the comparing unit 16 determines that the parameters need to be adjusted for the abnormal point P1a, and when the first threshold is set to $|\beta 1|$, the comparing unit 16 determines that the parameters do not need to be adjusted for the abnormal point P1a.

Second Exemplary Determination Method

The comparing unit 16 calculates the absolute value of the amount of difference $\Delta a$ between the absolute value of acceleration of the reference data and the absolute value of acceleration of the processing head 22 obtained upon test operation. When the absolute value of the amount of difference $\Delta a$ is greater than a second threshold, the comparing unit 16 determines that the parameters need to be adjusted. In addition, when the absolute value of the amount of difference $\Delta a$ is less than or equal to the second threshold, the comparing unit 16 determines that the parameters do not need to be adjusted.

For example, at an abnormal point P1b, the acceleration of the processing head 22 obtained upon test operation has not reached the level of the reference data. Specifically, at the abnormal point P1b, the absolute value of acceleration of the acceleration characteristic 65a has not reached the absolute value of acceleration of the acceleration characteristic 53 which is the reference data. In this case, when the absolute value of the amount of difference Δa between the absolute value of acceleration of the acceleration characteristic 53 and the absolute value of acceleration of the acceleration characteristic 65a is greater than the second threshold, the comparing unit 16 determines that the parameters need to be adjusted.

Note that although in the second exemplary determination method a case in which the amount of difference Δa has a positive value is described, even if the amount of difference Δa has a negative value, the comparing unit 16 makes the same determination as that for the case in which the amount of difference Δa has a positive value. Namely, even if the absolute value of acceleration of the processing head 22 obtained upon test operation is greater than or equal to the absolute value of acceleration of the reference data, when the absolute value of the amount of difference Δa is smaller than the second threshold, the comparing unit 16 determines that the parameters do not need to be adjusted.

Third Exemplary Determination Method

The comparing unit 16 calculates a time difference Δt between the time T1 which is a deceleration start time of the reference data and the time T2 which is a deceleration start time obtained upon test operation. The time difference Δt is time indicating a difference between the time T2 and the time T1.

For example, at the abnormal point P2, the time T2 obtained upon test operation is delayed by the time difference Δt from the time T1 for the reference data. When the time difference Δt is greater than a third threshold, the comparing unit 16 determines that the parameters need to be adjusted. In addition, when the time difference Δt is less than or equal to the third threshold, the comparing unit 16 determines that the parameters do not need to be adjusted.

As such, the comparing unit 16 determines whether the parameters need to be adjusted, by any of the first to third exemplary determination methods. Namely, the comparing unit 16 makes any of a determination based on the absolute value of acceleration, a determination based on the absolute value of the amount of difference Δa between acceleration, and a determination based on the time difference Δt between deceleration start times. The comparing unit 16 can make a determination based on the absolute value of acceleration by appropriately setting the first threshold. In addition, the comparing unit 16 can make a determination based on the absolute value of the amount of difference Δa between acceleration by appropriately setting the second threshold. In addition, the comparing unit 16 can make a determination based on the time difference Δt between deceleration start times by appropriately setting the third threshold.

When the comparing unit 16 determines to adjust the parameters in a case of using the first exemplary determination method, the instruction creating unit 14 adjusts the parameters such that the absolute value of the acceleration of the processing head 22 obtained upon test operation is less than or equal to the first threshold.

In addition, when the comparing unit 16 determines to adjust the parameters in a case of using the second exemplary determination method, the instruction creating unit 14 adjusts the parameters such that the amount of difference Δa between the absolute value of the acceleration of the reference data and the absolute value of the acceleration of the processing head 22 obtained upon test operation is less than or equal to the second threshold.

In addition, when the comparing unit 16 determines to adjust the parameters in a case of using the third exemplary determination method, the instruction creating unit 14 adjusts the parameters such that the time difference Δt between the time T1 for the reference data and the time T2 obtained upon test operation is less than or equal to the third threshold.

Note that the comparison is not limited to a time-series comparison between the reference data and acceleration obtained upon test operation, and the laser processing machine 1 may compare the reference data with acceleration obtained upon test operation, using Fast Fourier Transform (FFT) analysis. In this case, the comparing unit 16 performs a frequency transform such as a fast Fourier transform on the acceleration obtained upon test operation. The frequency transform of the first embodiment is a process of transforming time-series data into frequency-domain data. In other words, the frequency transform of the first embodiment is a process of transforming acceleration into a distribution of the strengths of frequency components. Specifically, the comparing unit 16 calculates, from acceleration provided as time-series data, the strengths of respective frequency components of the acceleration using a fast Fourier transform. The comparing unit 16 extracts a first maximum value which is the maximum value of strengths of frequencies excluding a frequency of 0, from results of the transform obtained by the fast Fourier transform. Furthermore, the comparing unit 16 compares a second maximum value which is the maximum value of strengths of frequencies excluding a frequency of 0 from among frequencies obtained by performing a fast Fourier transform on the reference data, with the aforementioned first maximum value and transmits a result of the comparison to the instruction creating unit 14. Note that the second maximum value may be calculated by the comparing unit 16 or may be calculated by other apparatuses than the control unit 10.

Then, the instruction creating unit 14 adjusts a filter range of a notch filter which is a parameter, based on the result of the comparison. The notch filter is to filter the frequency of vibration of the processing head 22, and filters frequencies in a set specific range. The notch filter is also called a band-stop filter or a band-rejection filter.

Figure 9:
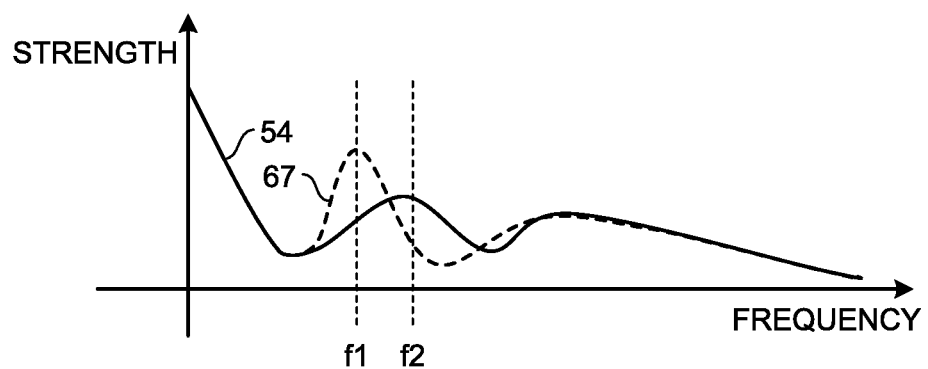
FIG. 9 is a diagram for describing a comparison process between reference data and acceleration obtained upon test operation, using a fast Fourier transform according to the first embodiment.

FIG. 9 is a diagram for describing a comparison process between the reference data and the acceleration obtained upon test operation, using a fast Fourier transform according to the first embodiment. FIG. 9 illustrates a relationship between frequency and the strength of a frequency component for when the acceleration illustrated in FIG. 7 is subjected to a fast Fourier transform. A vertical axis of a graph illustrated in FIG. 9 represents the strength of a frequency component, and a horizontal axis represents frequency. The strength of a frequency component is a proportion of the frequency component in the entire frequency.

A frequency characteristic 54 of FIG. 9 indicates the frequency of vibration of the processing head 22 obtained when test operation is performed with the drive shaft 24 being in a normal state. Therefore, the frequency characteristic 54 is the frequency of the processing head 22 corresponding to reference data.

A frequency characteristic 67 indicates the frequency of vibration of the processing head 22 obtained when test operation is performed with the drive shaft 24 being in an abnormal state. The comparing unit 16 calculates the frequency characteristic 67 by performing a fast Fourier transform on the acceleration obtained upon test operation. Note that the comparing unit 16 may calculate a frequency characteristic such as the frequency characteristic 67 by performing a frequency transform other than a fast Fourier transform on the acceleration obtained upon test operation.

In the frequency characteristic 54 corresponding to the reference data, the resonance frequency is present at a frequency f2, but in the frequency characteristic 67 corresponding to the acceleration obtained upon test operation, the resonance frequency is present at a frequency f1. As such, the frequency f1 which is the resonance frequency obtained after deterioration of the drive shaft 24 is shifted from the frequency f2 which is the resonance frequency obtained before deterioration of the drive shaft 24.

Since before deterioration of the drive shaft 24 the resonance frequency is the frequency f2, the instruction creating unit 14 has set the notch filter to the frequency f2 before deterioration of the drive shaft 24. Then, when the resonance frequency is shifted to the frequency f1 due to the deterioration of the drive shaft 24, the instruction creating unit 14 adjusts the notch filter to the frequency f1. By this, when the drive shaft 24 deteriorates, the laser processing machine 1 can suppress the component of the frequency f1 which is the resonance frequency, and thus, can suppress the vibration of the processing head 22.

Note that after the laser processing machine 1 adjusts the parameters at step S80 described in FIG. 3, the laser processing machine 1 may repeat the processes at step S40 to S80 described in FIG. 3. Namely, after the laser processing machine 1 adjusts the parameters, the laser processing machine 1 may perform test operation again, and determine again whether the parameters need to be adjusted, and adjust the parameters as necessary. In this case, after the control unit 10 adjusts the parameters, the control unit 10 performs test operation again, and readjusts the parameters based on a result of a comparison between fourth acceleration which is the processing speed of the processing head 22 obtained when the test operation is performed again and the reference data. In this case, too, the control unit 10 adjusts the parameters so as to reduce a difference between a track of the processing head 22 obtained when the test operation is performed again and a track of the processing head 22 corresponding to the reference data. A process of performing test operation again is an off-line process different than a laser processing process.

As such, since the laser processing machine 1 performs test operation and adjusts the parameters using acceleration obtained upon the test operation, parameters do not need to be calculated in real time during product processing. Therefore, since the control unit 10 requires only a small processing load, the control unit 10 can be formed using a low-cost processor.

Note that for the acceleration characteristics of the processing head 22, a plurality of abnormal points may coincide. For example, an abnormality in which the absolute value of acceleration is insufficient such as the abnormal point P1a and an abnormality in which the time at which the acceleration starts to increase is delayed such as the abnormal point 92 may coincide.

Figure 10:
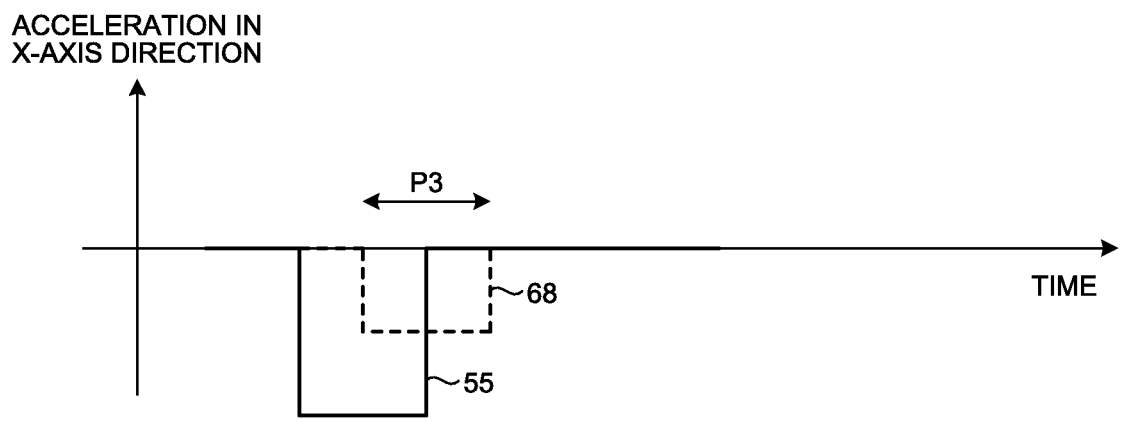
FIG. 10 is a diagram for describing an example of acceleration in the X-axis direction of the processing head for when a plurality of abnormal points coincide.

FIG. 10 is a diagram for describing an example of acceleration in the X-axis direction of the processing head for when a plurality of abnormal points coincide. A horizontal axis of a graph illustrated in FIG. 10 represents time, and a vertical axis represents the acceleration of the processing head 22 in the X-axis direction. An acceleration characteristic 55 of FIG. 10 indicates the acceleration of the processing head 22 obtained when test operation is performed with the drive shaft 24 being in a normal state. Therefore, the acceleration characteristic 55 is reference data. An acceleration characteristic 68 at an abnormal point P3 illustrated in FIG. 10 indicates the acceleration of the processing head 22 obtained when test operation is performed with the drive shaft 24 being in an abnormal state.

The abnormal point P3 indicates a case in which an overshoot of the processing head 22 occurs and an acceleration start or a deceleration start of the processing head 22 is delayed. In such a case, the instruction creating unit 14 adjusts a parameter for eliminating the delay of the acceleration start or deceleration start of the processing head 22. Thereafter, the laser processing machine 1 performs test operation again. Then, the instruction creating unit 14 adjusts a parameter for eliminating the overshoot, of the processing head 22, based on a result of the reperformance of the test operation.

As such, when two abnormal points coincide, the laser processing machine 1 eliminates the first abnormal point based on a result of performance of the first test operation, and eliminates the second abnormal point based on a result of performance of the second test operation. Note that when a plurality of abnormal points coincide, the laser processing machine 1 may eliminate the abnormal points in any order.

When despite the control unit 10 making parameter adjustment, the difference between the track of the processing head 22 obtained when test operation is performed and the track of the processing head 22 corresponding to the reference data does not fall within an allowable range, the drive shaft 24 is replaced.

Note that the control unit 10 may set an allowable range within which parameter adjustment is allowed. In this case, when, as a result of the control unit adjusting a parameter to eliminate an abnormal point, the parameter exceeds the allowable range, the control unit. 10 may display information indicating the excess of the allowable range on the display unit 30. In other words, when the operation of the drive shaft 24 exceeds the allowable range as a result of the control unit 10 adjusting the drive shaft 24, the control unit 10 may display information indicating the excess of the allowable range on the display unit 30. In addition, the control unit 10 may display information indicating a recommendation to replace the drive shaft 24 on the display unit 30, together with information indicating the excess of the allowable range. When the drive shaft 24 has been replaced, the control unit 10 resets the parameters to their pre-adjusted initial values. By this, when the drive shaft 24 has been replaced, the control unit 10 can bring the operation of the drive shaft 24 back to pre-adjusted initial operation.

Now, mechanical apparatuses of comparative examples will be described. A mechanical apparatus of a first comparative example detects an abnormality in the acceleration of a processing shaft during processing. However, the processing shaft cannot be moved to a desired position only by detecting an abnormality in the acceleration of the processing shaft during processing. In this case, the mechanical apparatus of the first comparative example cannot move the processing shaft to the desired position unless the processing shaft is replaced. On the other hand, the laser processing machine 1 of the first embodiment adjusts the parameters based on a result of a comparison between acceleration of the processing head 22 measured upon test operation and the reference data, and thus, can move the processing head 22 to a desired position without replacing the drive shaft 24. Therefore, since the life of the drive shaft 24 and the motor 21 can be extended, the replacement cycles of the drive shaft 24 and the motor 21 can be extended, leading to a reduction in cost.

In addition, in a mechanical apparatus of second comparative example, a sensor is mounted on a motor. However, when a sensor is mounted on the motor, vibration of a processing head caused by deterioration of a drive shaft which is disposed more on the end side than the motor cannot be detected. Even when a track of movement of the processing head is displaced from a desired position due to vibration of the processing head, such a mechanical apparatus of the second comparative example cannot detect the displacement. On the other hand, in the laser processing machine 1 of the first embodiment, since the sensor 23 is mounted on the processing head 22, when a track of movement of the processing head 22 is displaced from a desired position, the laser processing machine 1 can detect the displacement.

In addition, a mechanical apparatus of a third comparative example adjusts a processing condition in a laser processing process, and thus, processing load for when the processing condition is adjusted increases. Particularly, when the mechanical apparatus is an apparatus that performs high-speed processing such as a laser processing machine, even if the processing condition is adjusted during laser processing, the adjustment cannot be made in time.

In addition, when the operator adjusts the parameters based on processing results obtained when products are actually processed, since the operator determines parameters by repeating parameter adjustment and actual processing, it requires a long time to determine parameters, and materials for actual processing are required. On the other hand, the laser processing machine 1 of the first embodiment adjusts the parameters based on a result of a comparison between acceleration obtained upon test operation and the reference data, and thus, can adjust the parameters in a short time. In addition, since the laser processing machine 1 of the first embodiment performs test operation off-line, materials for actual processing are not required.

As such, according to the first embodiment, since the laser processing machine 1 automatically adjusts the parameters based on a result of a comparison between acceleration of the processing head 22 obtained upon test operation and the reference data, the vibration of the drive shaft 24 can be easily suppressed. In addition, since the laser processing machine 1 adjusts the parameters after performing test operation off-line, the laser processing machine 1 does not need to adjust the parameters during a laser processing process. Hence, the processing load of the control unit 10 for when the parameters are adjusted can be suppressed. Therefore, vibration of the processing head 22 can be easily suppressed with a small control load. In addition, since shaft adjustment of the drive shaft 24 is made in a different process than a laser processing process, the parameters can be adjusted in a short time without producing defective products. Therefore, the laser processing machine 1 can recover to its normal state in a short time without producing defective products.

Second Embodiment

Next, a second embodiment of the invention will be described using FIGS. 11 to 13. In the second embodiment, a laser processing machine transmits reference data and acceleration measured by the sensor 23 to an external computing apparatus through a network line, and the external computing apparatus computes parameters to be adjusted. Then, the laser processing machine receives the parameters from the external computing apparatus, and processes a product using the received parameters.

Figure 11:
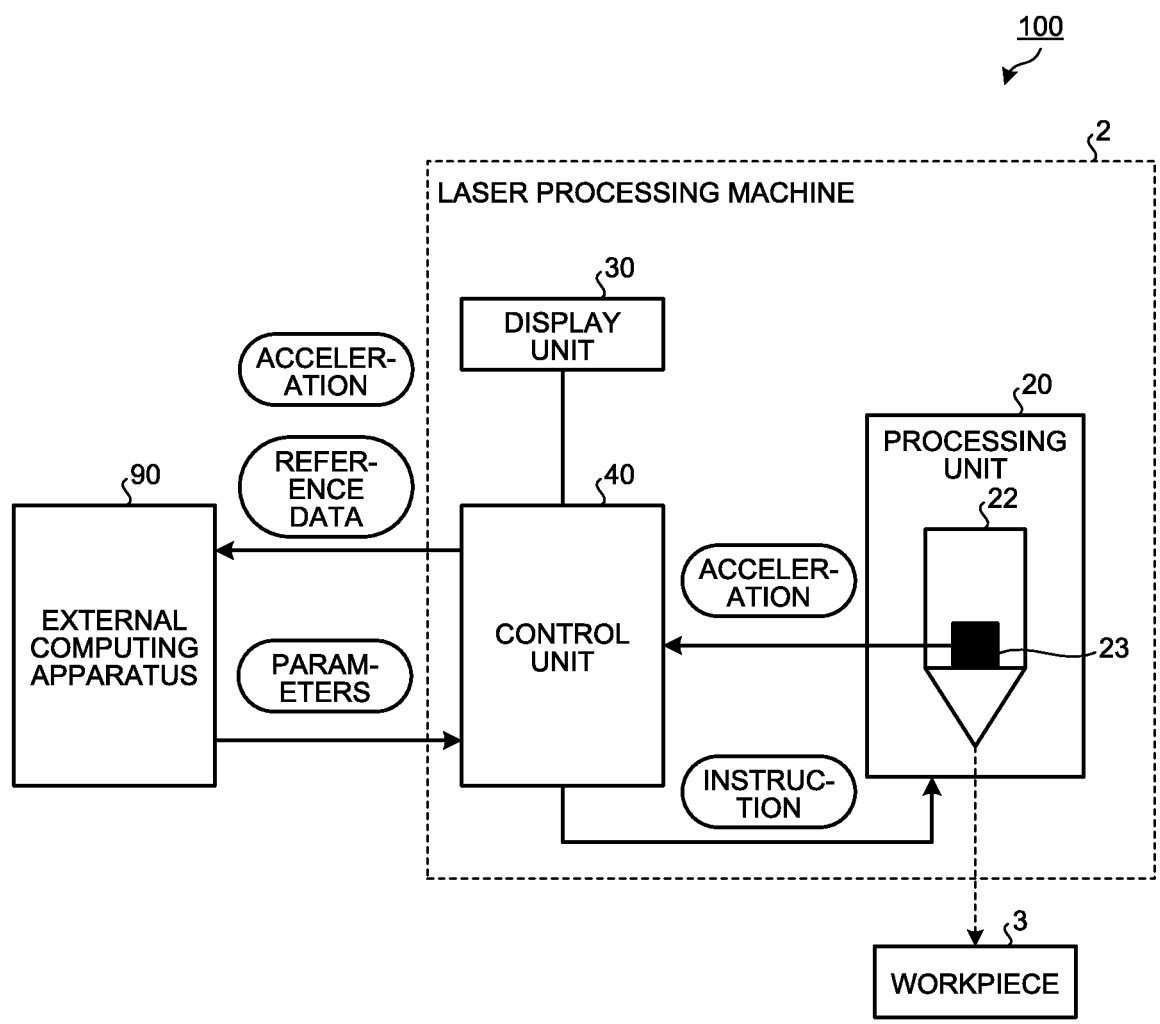
FIG. 11 is a diagram illustrating a configuration of a laser processing system according to a second embodiment.

FIG. 11 is a diagram illustrating a configuration of a laser processing system according to the second embodiment. Of the components of FIG. 11, components that achieve the same functions as the laser processing machine 1 of the first embodiment illustrated in FIG. 1 are denoted by the same reference characters, and an overlapping description is omitted.

A laser processing system 100 is a system using cloud computing, and includes a laser processing machine 2 and an external computing apparatus 90. The laser processing system 100 performs the same processes as the laser processing machine 1, using the laser processing machine 2 and the external computing apparatus 90. The laser processing machine 2 is connected to the external computing apparatus 90 through a network line, and transmits and receives various data to/from the external computing apparatus 90.

As with the laser processing machine 1, the laser processing machine 2 is an apparatus that performs laser processing on a workpiece 3 using laser light. The laser processing machine 2 includes the processing unit 20, a control unit 40 that controls the processing unit 20, and the display unit 30.

The processing unit 20 includes the processing head 22, and the sensor 23 is mounted on the processing head 22. The sensor 23 transmits measured acceleration of the processing head 22 to the control unit 40. The acceleration transmitted to the control unit 40 is, as with acceleration described in the first embodiment, acceleration of the processing head 22 measured upon product processing and acceleration of the processing head 22 measured upon test operation.

The control unit 40 has reference data stored therein, and transmits the reference data and the acceleration from the sensor 23 to the external computing apparatus 90. The reference data stored in the control unit 40 is, as with reference data described in the first embodiment, acceleration of the processing head 22 obtained when the processing head 22 normally performs test operation.

The external computing apparatus 90 is a computer that compares the reference data with the acceleration and calculates parameters based on a result of the comparison. The parameters calculated by the external computing apparatus 90 are, as with parameters described in the first embodiment, parameters for adjusting the operation of the drive shaft 24. Therefore, the parameters calculated by the external computing apparatus 90 are an example of information used to automatically adjust the drive shaft 24 for the processing head 22.

The external computing apparatus 90 transmits the calculated parameters to the control unit 40. By this, the control unit 40 sets the parameters from the external computing apparatus 90 as parameters used when the drive shaft 24 operates. Then, the control unit 40 outputs an instruction to the processing unit 20 using the adjusted parameters. The instruction outputted from the control unit 40 is, as with a movement instruction described in the first embodiment, an instruction for controlling the motor 21. As such, the control unit 40 adjusts the stored parameters using the parameters from the external computing apparatus 90.

Figure 12:
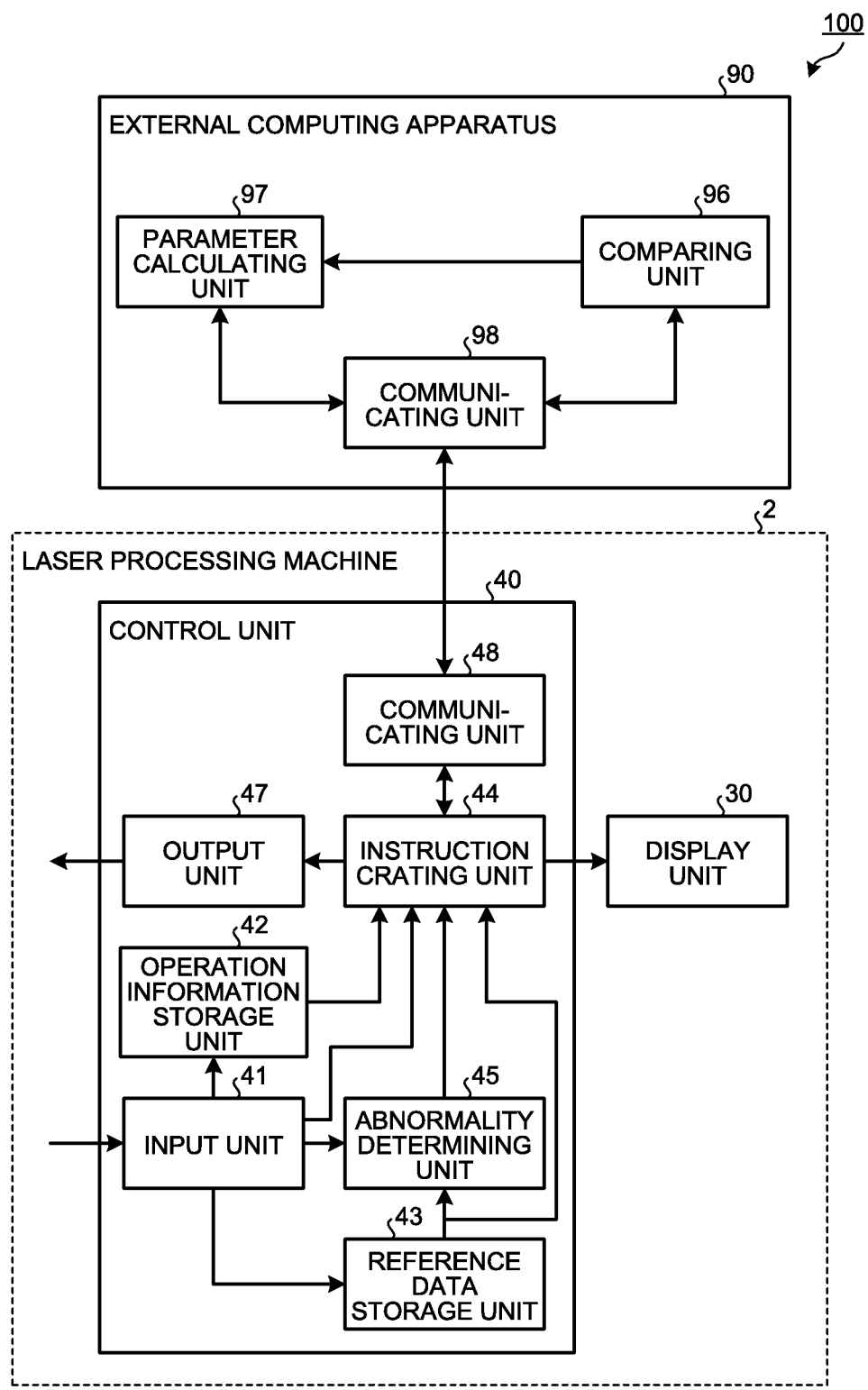
FIG. 12 is a block diagram illustrating configurations of an external computing apparatus and a control unit according to the second embodiment.

FIG. 12 is a block diagram illustrating configurations of the external computing apparatus and the control unit according to the second embodiment. Note that in FIG. 12 depiction of the processing unit 20 is omitted. The external computing apparatus 90 includes a comparing unit 96 having the same function as the comparing unit 16; a parameter calculating unit 97 that calculates parameters; and a communicating unit 98 that performs communication with the laser processing machine 2. The communicating unit 98 is connected to the comparing unit 96 and the parameter calculating unit 97, and the comparing unit 96 is connected to the parameter calculating unit 97.

The communicating unit 98 is connected to the control unit 40 in the laser processing machine 2, and receives the reference data and acceleration from the control unit 40. The communicating unit 98 transmits the reference data and acceleration received from the control unit 40 to the comparing unit 96. In addition, the communicating unit 98 transmits parameters calculated by the parameter calculating unit 97 to the control unit 40. The comparing unit 96 compares the reference data with the acceleration and transmits a result of the comparison to the parameter calculating unit 97.

As with the instruction creating unit 14 described in the first embodiment, the parameter calculating unit 97 calculates parameters with which the amount of vibration of the processing head 22 is less than or equal to a certain value. Specifically, the parameter calculating unit 97 calculates parameters based on the result of the comparison between the reference data and the acceleration. The parameter calculating unit 97 transmits the calculated parameters to the communicating unit 98.

The control unit 40 included in the laser processing machine 2 includes an input unit 41 having the same function as the input unit 11; an operation information storage unit 42 that stores the same information as the operation information storage unit 12; and reference data storage unit 43 that stores reference data as with the reference data storage unit 13. In addition, the control unit 40 includes an instruction creating unit 44 having some of the functions of the instruction creating unit 14; an abnormality determining unit 45 having the same function as the abnormality determining unit 15; an output unit 47 having the same function as the output unit 17; and a communicating unit 48 that performs communication with the external computing apparatus 90.

The input unit 41 is connected to the operation information storage unit 42, the reference data storage unit 43, the instruction creating unit 44, and the abnormality determining unit 45. In addition, the instruction creating unit 44 is connected to the operation information storage unit 42, the reference data storage unit 43, the abnormality determining unit 45, the communicating unit 48, and the output unit 47. In addition, the input unit 41 is connected to the sensor 23 and the external apparatus 5, the output unit 47 is connected to the motor 21, and the instruction creating unit 44 is connected to the display unit 30.

Upon product processing, the input unit 41 accepts acceleration from the sensor 23 and inputs the acceleration to the abnormality determining unit 45. In addition, upon test operation, the input unit 41 accepts acceleration from the sensor 23 and inputs the acceleration to the instruction creating unit 44. In addition, the input unit 41 inputs the processing program 121 and the test operation program 122 from the external apparatus 5 to the operation information storage unit 42. In addition, the input unit 41 inputs reference data from the external apparatus 5 to the reference data storage unit 43. The operation information storage unit 42 stores the processing program 121 and the test operation program 122.

Upon product processing, the abnormality determining unit 45 makes an abnormality determination which is the same process as the process of the abnormality determining unit 15, and transmits a determination result of the abnormality determination to the instruction creating unit 44. The instruction creating unit 44 transmits the reference data read from the reference data storage unit 43 and acceleration transmitted from the input unit 41 upon test operation, to the communicating unit 48. In addition, as with the instruction creating unit 14, the instruction creating unit 44 creates a movement instruction to allow the processing head 22 to move, based on parameters. When the instruction creating unit 44 has adjusted set parameters using parameters from the external computing apparatus 90, the instruction creating unit 44 creates a movement instruction based on the adjusted parameters.

The communicating unit 48 is connected to the communicating unit 98 in the external computing apparatus 90, and transmits the reference data and the acceleration to the external computing apparatus 90, and receives parameters from the external computing apparatus 90.

Next, a processing process procedure performed by the laser processing system 100 will be described. In the laser processing system 100, the external computing apparatus 90 and the laser processing machine 2 perform laser processing using the same procedure as the processing process procedure described in FIG. 3 of the first embodiment. Specifically, the laser processing machine 2 performs the processes at step S10 to S50 illustrated in FIG. 3, and thereafter, the external computing apparatus 90 performs the processes at step S60 to S80. Then, the laser processing machine 2 performs the process at step S90. Note that in the second embodiment, too, as in the case of the first embodiment, if the abnormality determining unit 45 has detected an abnormality, i.e., if Yes at step S30, by the control unit 40 being operated, the laser processing machine 2 performs test operation at step S40.

Now, the processes at step S60 to S80 performed by the external computing apparatus 90 will be described. The laser processing machine 2 transmits reference data and acceleration measured during test operation to the external computing apparatus 90. In the external computing apparatus 90, at step S60, the comparing unit 96 compares the acceleration of the processing head 22 obtained upon test operation with the reference data.

Then, at step S70, the comparing unit 96 determines whether the parameters need to be adjusted, by the same process as the process of the comparing unit 16. Then, the comparing unit 96 transmits a result of the comparison between the acceleration and the reference data to the parameter calculating unit 97.

If the comparing unit 96 determines that the parameters need to be adjusted, i.e., if Yes at step S70, the parameter calculating unit 97 calculates appropriate parameters. Then, the communicating unit 98 transmits the parameters calculated by the parameter calculating unit 97 to the communicating unit 48 in the laser processing machine 2. By this, at step S80, the instruction creating unit 44 adjusts the parameters. Then, at step S90, the laser processing machine 2 processes a next workpiece 3 which becomes a product.

On the other hand, if the comparing unit 96 determines that the parameters do not need to be adjusted, i.e., if No at step S70, the parameter calculating unit 97 does not adjust the parameters. In this case, the parameter calculating unit 97 generates information indicating that there is no change in parameters. Then, the external computing apparatus 90 transmits the information generated by the parameter calculating unit 97 to the laser processing machine 2. By this, at step S90, the laser processing machine 2 processes a next workpiece 3 which becomes a product, without changing the parameters. Note that the laser processing machine 2 may be set to automatically perform the processes at step S10 and S50 without accepting an instruction from the operator.

Now, a hardware configuration of the control units 10 and 40 will be described. Note that since the control units 10 and 40 have the same hardware configuration, the hardware configuration of the control unit 40 will be described here.

Figure 13:
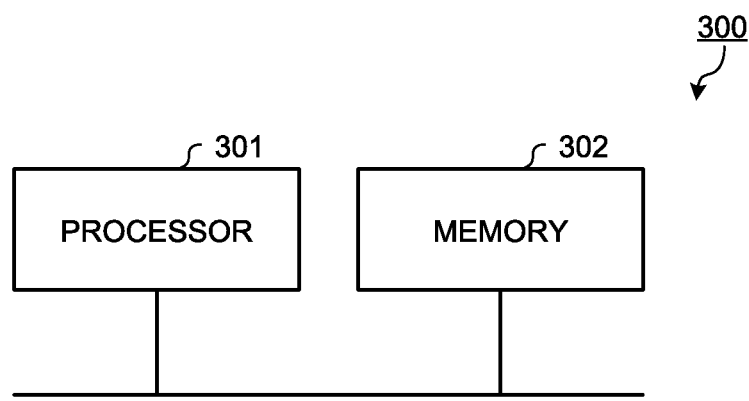
FIG. 13 is a diagram illustrating an exemplary hardware configuration of the control unit according to the second embodiment.

FIG. 13 is a diagram illustrating an exemplary hardware configuration of the control unit according to the second embodiment. The control unit 40 can be implemented by a control circuit 300 illustrated in FIG. 13, i.e., a processor 301 and a memory 302. Examples of the processor 301 include a Central Processing Unit (also called a CPU, a processing unit, an arithmetic unit, a microprocessor, a microcomputer, a processor, or a DSP) and a system Large Scale Integration (LSI). Examples of the memory 302 include a Random Access Memory (RAM) and a Read Only Memory (ROM).

The control unit 40 is implemented by the processor 301 reading and executing a program for performing the operation of the control unit 40, which is stored in the memory 302. In addition, it can also be said that the program is to cause a computer to perform a procedure or a method of the control unit 40. The memory 302 is also used as a temporary memory for when the processor 301 performs various types of processes.

The program executed by the processor 301 may be implemented by a computer program product which is a recording medium having the program stored therein. An example of the recording medium in this case includes a non-transitory computer-readable medium having the program stored therein.

As such, according to the second embodiment, since the laser processing machine 2 calculates parameters using the external computing apparatus 90, the laser processing machine 2 can automatically adjust the parameters with a smaller processing load than the laser processing machine 1. In addition, in the laser processing system 100, by storing reference data in advance in a different apparatus than the control unit 40, such as the external computing apparatus 90 or a server, data to be transmitted to the external computing apparatus 90 from the control unit 40 is only acceleration, and thus, the laser processing system 100 can easily adjust the parameters with a small amount of communication.

The configurations shown in the above-described embodiments show an example of the content of the present invention and can also be combined with other publicly known techniques, or some of the configurations can also be omitted or changed without departing from the spirit and scope of the present invention.

REFERENCE SIGNS LIST 1, 2 laser processing machine; 3 workpiece; 5 external apparatus; 10, 40 control unit; 11, 41 input unit; 12, 42 operation information storage unit; 13, 43 reference data storage unit; 14, 44 instruction creating unit; 15, 45 abnormality determining unit; 16, 96 comparing unit; 17, 47 output unit; 20 processing unit; 21 motor; 22 processing head; 23 sensor; 24 drive shaft; 30 display unit; 48, 98 communicating unit; 51, 61, 62 position characteristic; 52, 63, 64 speed characteristic; 53, 55, 65a, 65b, 66, 68 acceleration characteristic; 54, 67 frequency characteristic; 71 path; 90 external computing apparatus; 97 parameter calculating unit; 100 laser processing system; 121 processing program; 122 test operation program.

The invention claimed is:
1. A laser processing machine comprising:
a processing head having a sensor; and
a controller to which a signal from the sensor is inputted, wherein
the sensor is an acceleration sensor to measure acceleration of the processing head for when the processing head moves,
the controller determines whether the signal inputted from the sensor while the processing head moves during a laser processing process indicates an abnormal acceleration, the laser processing process performing a laser processing on a workpiece,
after the controller determines that the signal inputted from the sensor while the processing head moves during the laser processing process indicates the abnormal acceleration, the controller controls the processing head to perform a different process during which the laser processing is not performed on the workpiece and during which the signal from the sensor is inputted to be used by the controller to determine whether a shaft for the processing head needs to be adjusted,
the controller determines whether the shaft for the processing head needs to be adjusted based on the signal inputted from the sensor while the processing head moves during the different process during which the laser processing is not performed on the workpiece, and
when the controller determines that the shaft is in a state of needing adjustment, the controller adjusts the shaft for the processing head for use during the laser processing process.

2. The laser processing machine according to claim 1, wherein the shaft is adjusted by comparing data of a signal from the sensor with prestored data obtained during normal operation.

3. The laser processing machine according to claim 1, wherein when the shaft is in the state of needing adjustment, a fact that the shaft is in the state of needing adjustment is informed to an external source.

4. The laser processing machine according to claim 3, wherein information informed to the external source includes information calculated using data of a signal outputted from the sensor in the laser processing process, or data of a signal outputted from the sensor.

5. The laser processing machine according to claim 2, wherein the controller adjusts the shaft so as to reduce a difference between a moving track of the processing head obtained in the different process and a moving track of the processing head corresponding to the data obtained during normal operation.

6. The laser processing machine according to claim 2, wherein the data obtained during normal operation is data of a signal actually outputted from the sensor in the different process when operation of the processing head is normal.

7. The laser processing machine according to claim 1, wherein the controller adjusts the shaft by adjusting acceleration of the processing head obtained upon movement, moving speed of the processing head, gain used when movement of the processing head is controlled, or timing at which the processing head moves.

8. The laser processing machine according to claim 2, wherein the controller adjusts the shaft by performing a frequency transform on the data of the signal outputted from the sensor in the different process, extracting a first maximum value from results of the transform, comparing the first maximum value with a second maximum value, and adjusting a filter range of a notch filter based on a result of the comparison between the first maximum value and the second maximum value, the first maximum value being a maximum value of strengths of frequencies excluding a frequency of 0, the second maximum value being a maximum value of strengths of frequencies excluding a frequency of 0 from among frequencies obtained by performing a frequency transform on the data obtained during normal operation, and the notch filter filtering a frequency of vibration of the processing head.

9. The laser processing machine according to claim 3, wherein when operation of the shaft exceeds an allowable range as a result of adjusting the shaft, the controller informs the external source of information indicating the excess of the allowable range.

10. A laser processing system comprising:
a laser processing machine including a processing head having a sensor, and a controller to which a signal from the sensor is inputted; and
an external computing apparatus to receive the signal from the controller, the external computing apparatus being connected to the laser processing machine through a network line, wherein
the sensor is an acceleration sensor to measure acceleration of the processing head for when the processing head moves,
the controller determines whether the signal inputted from the sensor while the processing head moves during a laser processing process indicates an abnormal acceleration, the laser processing process performing a laser processing on a workpiece,
after the controller determines that the signal inputted form the sensor while the processing head moves during the laser processing process indicates the abnormal acceleration, the controller controls the processing head to perform a different process during which the laser processing is not performed on the workpiece and during which the signal from the sensor is inputted to be used by the controller to determine whether a shaft for the processing heads needs to be adjusted,
the controller determines whether the shaft for the processing head needs to be adjusted based on the signal inputted from the sensor while the processing head moves during the different process during which the laser processing is not performed on the workpiece, and when the shaft is in a state of needing adjustment, the external computing apparatus generates information for adjusting the shaft for the processing head for use during the laser processing process, and transmits the generated information to the controller, and
the controller receives the information and adjusts the shaft for the processing head using the information.

11. The laser processing system according to claim 10, wherein the shaft is adjusted by comparing data of a signal from the sensor with prestored data obtained during normal operation.

12. The laser processing system according to claim 10, wherein when the shaft is in the state of needing adjustment, a fact that the shaft is in the state of needing adjustment is informed to an external source.

* * * * *